United States Patent
Ellis (10) Patent No.: US 10,534,108 B2
(45) Date of Patent: Jan. 14, 2020

(54) METHODS AND SYSTEMS FOR THE INVERSION OF MAGNETIC DATA FROM REMNANT AND INDUCED SOURCES IN GEOPHYSICAL EXPLORATION

(75) Inventor: Robert G. Ellis, Vancouver (CA)

(73) Assignee: Geosoft Inc., Toronto, Ontario (CA)

( * ) Notice: Subject to any disclaimer, the term of this patent is extended or adjusted under 35 U.S.C. 154(b) by 1143 days.

(21) Appl. No.: 14/342,139

(22) PCT Filed: Aug. 28, 2012

(86) PCT No.: PCT/CA2012/050594
§ 371 (c)(1),
(2), (4) Date: Jun. 16, 2014

(87) PCT Pub. No.: WO2013/029174
PCT Pub. Date: Mar. 7, 2013

(65) Prior Publication Data
US 2014/0350903 A1  Nov. 27, 2014

Related U.S. Application Data (60) Provisional application No. 61/530,232, filed on Sep. 1, 2011.

(51) Int. Cl.
*G01V 99/00* (2009.01)
*E21B 47/022* (2012.01)
*G01V 3/08* (2006.01)
*G01V 3/38* (2006.01)
*G01V 3/40* (2006.01)

(52) U.S. Cl.
CPC ...... *G01V 99/005* (2013.01); *E21B 47/02216* (2013.01); *G01V 3/081* (2013.01); *G01V 3/38* (2013.01); *G01V 3/40* (2013.01); *G01V 3/087* (2013.01); *G01V 2210/66* (2013.01)

(58) Field of Classification Search
CPC ...... G06F 17/5009; G01V 3/081; G01V 1/38; G01V 3/40; G01V 99/005; G01V 3/87; G01V 3/38; G01V 2210/66; G01V 3/087; E21B 47/02216
USPC ...................................................... 703/2, 10
See application file for complete search history.

(56) References Cited

U.S. PATENT DOCUMENTS 9,207,351 B2 * 12/2015 Dickens et al. ....... G01V 3/083

OTHER PUBLICATIONS

Lelievre, Peter and Oldenburg, Douglas. A 30 total magnetization inversion applicable when significant complicated remanence is present. Geophysics, vol. 74, No. 3 (May-Jun. 2009), pp. L21-L30. 10.1190/1.3103249.*

(Continued)

Primary Examiner — Kamini S Shah
Assistant Examiner — John E Johansen
(74) Attorney, Agent, or Firm — McMillan LLP (57) ABSTRACT

A method for modeling a subsurface anomalous magnetization zone including the steps of generating a magnetic field model of the subsurface anomalous magnetization zone, inverting the magnetic field model; and generating a model of the sub-surface anomalous magnetization zone based on the inversion. The step of generating the magnetic field model include generating the magnetic field model from induced magnetization sources and remnant magnetization sources.

12 Claims, 11 Drawing Sheets

(56) References Cited

OTHER PUBLICATIONS

Shearer, Sarah and Yaoguo Li. 3D inversion of magnetic total gradient data in the presence of remanent magnetization. SEG Technical Program Expanded Abstracts 2004. Society of Exploration Geophysicists, (2004). pp. 774-777.*
Commer, Michael. Three-dimensional gravity modelling and focusing inversion using rectangular meshes. Geophysical Prospecting 59.5, (2011). 966-979.*
Lelievre, Peter and Oldenburg, Douglas. A 30 total magnetization inversion applicable when significant complicated remanence is present. Geophysics, vol. 74, No. 3 (May-Jun. 2009), pp. L21-L30. 10.1190/1.3103249 (Year: 2009).*
Shearer, Sarah and Yaoguo Li. 3D inversion of magnetic total gradient data in the presence of remanent magnetization. SEG Technical Program Expanded Abstracts 2004. Society of Exploration Geophysicists, (2004). pp. 774-777. (Year: 2004).*
Commer, Michael. Three-dimensional gravity modelling and focusing inversion using rectangular meshes. Geophysical Prospecting 59.5, (2011). 966-979. (Year: 2011).*
Peter G. Lelievre et al. Apr. 10, 2009 (Oct. 4, 2009) A 3D total magnetization inversion applicable when significant, complicated remanence is present Geophysics vol. 74, No. 3, pp. L21-L30.
Walter E. Medeiros et al. Sep.-Oct. 1995 Simultaneous estimation of total magnetization direction and 3-D spatial orientation. Geophysics vol. 60, No. 5 pp. 1365-1377.

* cited by examiner

METHODS AND SYSTEMS FOR THE INVERSION OF MAGNETIC DATA FROM REMNANT AND INDUCED SOURCES IN GEOPHYSICAL EXPLORATION

CROSS-REFERENCE TO RELATED APPLICATIONS

This application claims the benefit of U.S. Provisional Application No. 61/530,232, filed Sep. 1, 2011, the entire contents of which are herein expressly incorporated by reference.

FIELD OF THE INVENTION

The invention relates to the field of geophysical exploration and earth modeling and more particularly, to methods and systems for earth modeling using magnetic data inversion from remnant and induced sources.

BACKGROUND OF THE INVENTION

Exploration for oil and gas in subsurface environments has historically been done using seismic imaging techniques that are now well known in the art. Exploration for minerals has historically been done using a wider variety of techniques including gravimetric, magnetics, electromagnetics, and induced polarization techniques that are well known in the art. All these imaging techniques attempt to identify a subsurface anomalous physical property (acoustic velocity, density, susceptibility, etc.) space that may be indicative of a mineral deposit. The utility of magnetic field data has also become prevalent in many areas of geophysical exploration, and including the application of 3D voxel inversion to aid in this magnetic data interpretation. Generally, voxel based inversions use magnetic field data from a magnetic response arising from induction—that is from the magnetic field emitted by a particular anomalous magnetization zone. It has recently been discovered that external influences on the induced magnetic field of the magnetization space, particularly during inversion, may be having a disproportionate impact on the model being generated. These external factors, also referred to as remnant magnetization typically affects crustal rocks as well as zones of mineralization. Note that we use the term "remnant magnetization" herein to include all non-induced magnetization effects, including but not limited to, magnetic remanence, demagnetization, and magnetic anisotropy. Unfortunately, remnant magnetization can seriously distort inversion based on the assumption that the source is only induced magnetization. The severity of the distortion is due to the highly non-unique nature of potential field inversion making it extraordinarily easy for a potential field inversion to produce a seemingly plausible model which agrees satisfactorily with the observed data, even when a fundamental assumption in the inversion is flawed.

There is a need in the art to solve one or more of the above-identified problems with the prior art and for an improved method and system for earth modelling, and particularly for earth modelling of regions having one or more anomalous magnetization zones.

SUMMARY OF THE INVENTION

According to one embodiment of the invention, there is provided a method for modeling a subsurface anomalous magnetization zone including the steps of generating a magnetic field model of the subsurface anomalous magnetization zone, inverting the magnetic field model, and generating a model of the subsurface anomalous magnetization zone based on the inversion. The first generating step includes generating the magnetic field model from induced magnetization sources and remnant magnetization sources.

According to one aspect of this embodiment, the inverting step includes an inversion wherein induced magnetization portions of the magnetic field model are modified by remnant magnetization portions of the magnetic field model.

According to another aspect of this embodiment, the magnetic field model comprises a total magnetic intensity model.

According to another aspect of this embodiment, the inverting step includes applying a vector representation to induced magnetization portions of the magnetic field model.

According to another embodiment of the invention, there is provided a method for modeling a subsurface anomalous magnetization zone comprising generating an induced magnetic field model of the subsurface anomalous magnetization zone, generating a remnant magnetic field model of the subsurface anomalous magnetization zone, combining the remnant and induced magnetic field models to form a total magnetic field model, inverting the total magnetic field model, and generating a model of the subsurface anomalous magnetization zone based on the inverting.

According to one aspect of this embodiment, the inverting step includes applying a vector representation to induced magnetization and non-induced portions of the magnetic field model.

According to other embodiments of the invention, there is provided a non-transitory computer readable medium having instructions thereon for executing a computer program that when executed on a computer carries out a method for modeling a subsurface zone of anomalous magnetization that includes the steps of any of the aforementioned embodiments recited in method form.

Accordingly, it is an object of the invention to mitigate one or more of the deficiencies of the prior art as herein identified.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION

Generally, the invention provides for a method referred to herein as magnetization vector inversion, which incorporates both remnant and induced magnetization, and in particular without prior knowledge of the direction or strength of remnant magnetization. As will be discussed below, conventional scalar modifiers to magnetic inversion techniques are replaced or augmented with modifiers based on sources of remnant magnetization. That is, applicant modifies the inversion to accommodate for the source magnetization amplitude and direction of these remnant magnetization sources. While this increases the number of variables and adds complexity to the prior art modelling inversion methods, it will be demonstrated herein below that the same regularization principles that allow compact targets to be resolved in highly unconstrained scalar inversion also apply in vector inversion.

Applicant has discovered that magnetization vector inversion as herein proposed, or more generally, inversion including all forms of magnetization (ie. induced magnetization and remnant magnetization), significantly improves the interpretation of the mineral deposits based on prior art magnetic field inversions. Applicant has applied the teachings of this invention to a large number of magnetic field surveys and finds the results to be significantly superior to conventional scalar based inversion. An example of one such implementation is provided later in this description.

The invention provides for an improved method and system for modeling subsurface regions of the earth. The models are preferably generated using voxel-based modeling, whereby subsurface regions, including those encapsulating a magnetization zone being investigated, are modeled using an array of elements of volume that constitute a notional three-dimensional space. The three-dimensional space being modeled is thus divided into an array of discrete elements which represent this space. Data acquired from magnetic techniques are all converted into representative voxel data so that the data may be combined and manipulated as appropriate to arrive at the best model for a region of geophysical exploration. General methods of manipulating voxel data are generally known. Reference to datasets, various types of data and manipulations of data throughout this description are, unless otherwise noted, made with respect to voxel data or datasets. The invention contemplates the use of various other types of data as would be known in the art for creating geophysical models.

Figure 2:
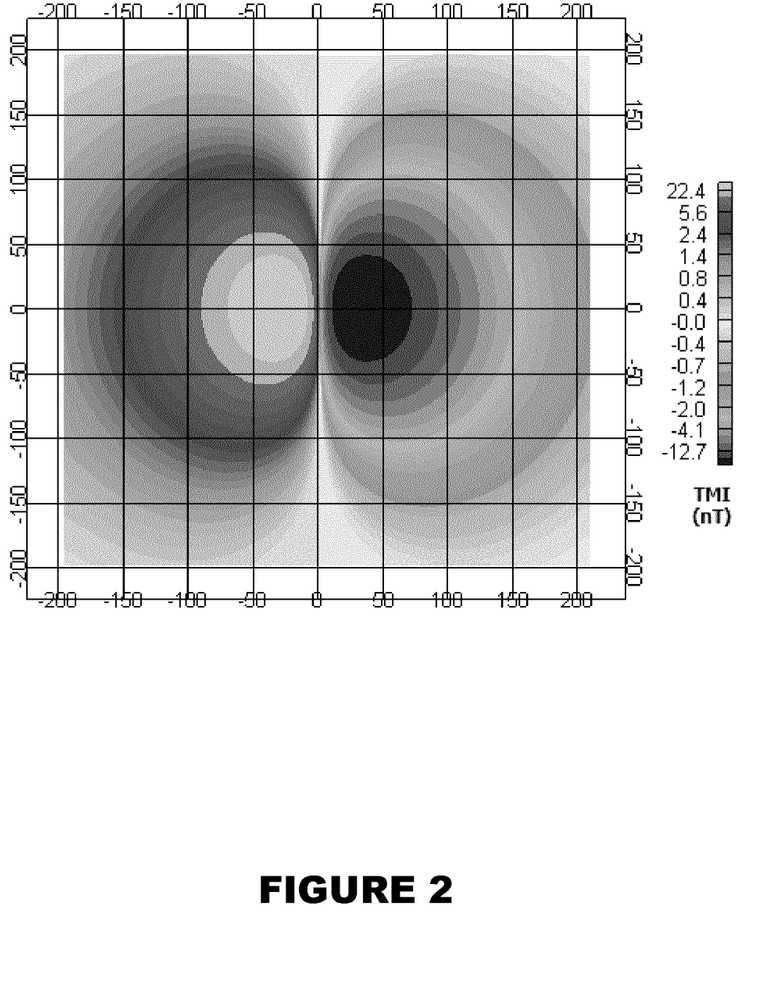
FIG. 2 shows the total magnetic intensity data simulated over the model of FIG. 1.

In addition, various aspects of the invention may be implemented on a computer system, and particularly for carrying out the various data manipulations herein described. One such computer system is shown in FIG. 2 and may generally include a number of physical and logical components, including a central processing unit ("CPU"), random access memory ("RAM"), an input/output ("I/O") interface, a network interface, non-volatile storage, and a local bus enabling the CPU to communicate with the other components. The CPU executes an operating system, and a number of software systems, including those carrying out the method of the invention. RAM provides relatively-responsive volatile storage to the CPU. The I/O interface allows for input to be received from one or more devices, such as a keyboard, a mouse, etc., and outputs information to output devices, such as a display and/or speakers. The network interface permits communication with other systems. Non-volatile storage stores the operating system and programs, including computer-executable instructions. During operation of the computer system, the operating system, the programs and the data may be retrieved from the non-volatile storage and placed in RAM to facilitate execution. Furthermore, more than one computer system may be used. Additional computer systems may be used to carry out different steps of the method herein described.

As described above, while the invention may be used and applied to various forms of subsurface exploration and modeling, the invention is particularly useful for identifying zones of anomalous densities. The method of the invention provides for a more accurate and precise model of such zones by incorporating information gleaned from remnant magnetization analysis, without prior knowledge of the strength or direction of the remnant magnetic sources. For the purposes of this description, the term induced magnetization refers to the component of a rock's magnetization which responds to sources of external magnetism, typically the Earth's ambient magnetic field and is proportional to, and has the same direction as, the ambient magnetic field. It is important to note that induced magnetization is typically proportional to the susceptibility of the material being magnetized and has the same direction as the Earth's field.

The term remnant magnetization refers to the base or permanent magnetization from the rock in which the magnetization zone being investigated is located. It is worthwhile to note that remnant magnetization is permanent and can have any direction. References to the phrase, the region being investigated, refers to a subsurface magnetization zone where a suspect mineral deposit is present, and does not refer to the overall region including the surface, sediment and rock layers that may be present around the mineral deposit.

Figure 1:
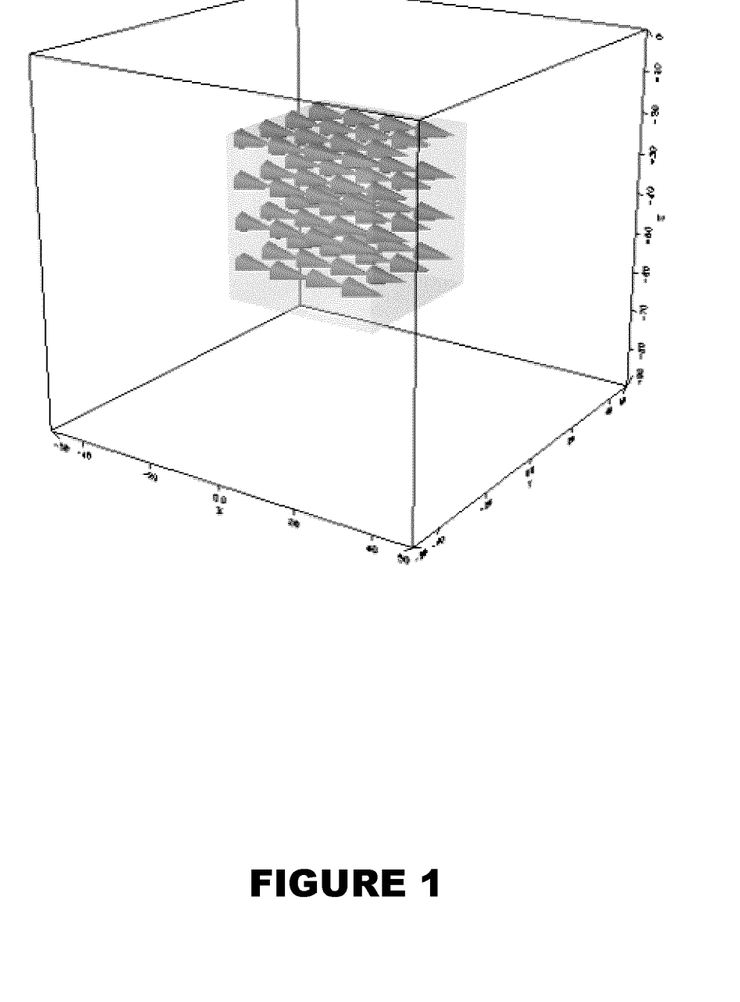
FIG. 1 shows a hypothetical known buried prism model.

Referring now to FIG. 1, the invention generally includes a method for mapping subsurface regions of the earth including the steps of forming or acquiring a model of the entire magnetic field 110 at one or more points in the subsurface region being modeled, including the magnetization from all sources in this region, inverting the response of the magnetic field from all sources 120, and generating a model of the subsurface region 130 based on the inversion in step 120.

In step 110 of FIG. 1, the model of a particular subsurface region is obtained. Preferably, a TMI (total-magnetic-intensity) model is obtained, and generally from airborne geophysical surveys. The total magnetic intensity model includes magnetization from all sources, including induced and remnant sources—this is in contrast to prior art methods where induced magnetization was only measure. Including remnant sources of magnetization in the model is counter-intuitive as it results in more variables in the inversion process, and in addition as will be seen below, the inversion results in variability in the magnetization direction as the modifier to the induced magnetization that is measured includes initially unknown directional effects. That is, while prior art methods that included scalar conversions to the induced magnetic response did not include directional variability (ie. since by definition the induced magnetic response follows the Earth's gravitational field), applicant has surprisingly discovered that applying vector conversions based on other remnant sources of magnetism acting on results in a more accurate survey of the mineral deposit.

According to step 120, the response, including the vector conversions is inverted, accounting for all sources of magnetization, including induced and remnant sources. Finally, a model of the geological area being studied is derived based on this inversion.

In one variation, the step of acquiring a model of the entire magnetic field may include sub-steps wherein the magnetic field from induced sources is acquired and the magnetic field from remnant sources is acquired prior to combining each of these to form the total magnetic field. The inversion and other steps are carried out as elsewhere described.

While various specific adaptations and ways of acquiring the total magnetic response, and subsequently applying the aforementioned inversion are contemplated by the invention, applicant describes herein below an exemplary way of carrying out the acquiring of the response, applying the vector-based inversion and generating the subsequent model. The description below is then supplemented with one theoretical example and one real world example to illustrate both the complexity in carrying out embodiments of the invention, and the improvements in the model generated by prior art methods.

One computer-based implementation of the invention may be carried out by applying the following series of steps and calculations to TMI data obtained by airborne acquisition methods. The TMI data may be obtained by airborne survey methods known in the art—although, in the prior art, the magnetic intensity is generally filtered to include only sources of induced magnetization.

Starting with the very general assumption that the magnetic properties of the earth can be represented by a volume magnetization, M(r), while making no assumptions about whether the source of the magnetization is induced, remanent, or otherwise.

From magnetostatics principles, the magnetic field B at point $r_j$ resulting from a volume V containing magnetization, M(r), is given by:

$$B(r_j) = \nabla \int_V M(r) \cdot \nabla \frac{1}{|r - r_j|} dr^3 \quad (1)$$

From this, applicant shows that the magnetization vector M(r) is a proper parameter for inversion.

If the volume V consists of a collection of N sub-volumes $v_i$ each consisting of constant magnetization $m_i$ then:

$$B_\beta(r_i) = \sum_{k,\alpha}^{N,3} m_{k,\alpha} \int_{v_k} \partial_\alpha \partial_\beta \frac{1}{|r - r_j|} dr^3 \quad (2)$$

This defines the forward problem, given a set of sources $m_k$ (k=1, ..., N) then $B_j$ is the predicted magnetic field anomaly at points $r_j$ (j=1, ..., M). As will be observed, the coordinate index α is summed over the range indicating that it is possible to select the most computationally convenient internal coordinate system. Furthermore, a coordinate invariant quantity, such as the amplitude of the volume magnetization, will be most robustly determined from the data.

For conciseness, equation (2) may be represented simply as $$B = Gm \quad (3)$$

Next, the vector magnetization inverse problem may be defined as solving for m given B subject to an appropriate regularization condition. Although there are many choices for regularization, applicant selects without loss of generality, the known Tikohonov minimum gradient regularizer. The inverse problem thus becomes solving for m in:

$$\text{Min} \phi(m) = \phi_D(m) + \lambda \phi_M(m) \quad (4)$$

$$\phi_D(m) = \sum_j^M \left| \frac{G_j m - B_j}{e_j} \right|^2$$

$$\phi_M(m) = \sum_\gamma^3 |w_\gamma \partial_\gamma m|^2 + |w_0 m|^2$$

$$\lambda: \phi_D(m) = \chi_T^2$$

Where in the first line, the total objective function φ is the sum of a data term $\phi_D$ and a model term $\phi_M$ with a Tikohonov regularization parameter λ. The second line defines the data objection function in terms of the data equation (3) and the error associated with each data point, $e_j$. The third line gives the model objective function in terms of the gradient of the model $\delta_\gamma m$ and the amplitude of the model, with weighting terms as required, $w_\gamma$, $w_o$. The fourth line indicates that the Tikohonov regularization parameter is chosen based on a satisfactory fit to the data in a chi-squared sense. In addition, other constraints, such as upper and lower bounds, can be placed on m as appropriate to the specific exploration problem being solved.

EXAMPLE 1

This example shows the method of the invention applied to the theoretical buried prism model that is common in the art. Although the model is simplistic and has little exploration significance, it is beneficial for illustrative purposes.

Considering the inversion of simulated TMI data over a buried prism with magnetization vector perpendicular to the earth field, the model consists a cube with side length 40 m buried with a depth to top of 20 m and a magnetization vector in the EW direction, (as shown in FIG. 1).

Simulated TMI data are shown in FIG. 2 for Earth field with inclination 90 and amplitude 24000 nT. Cardinal directions have been chosen only for simplicity of explanation; any directions could be chosen with equivalent results. Also for simplicity, the data were simulated at 20 m constant clearance and on a regular 8 m grid.

Figure 3:
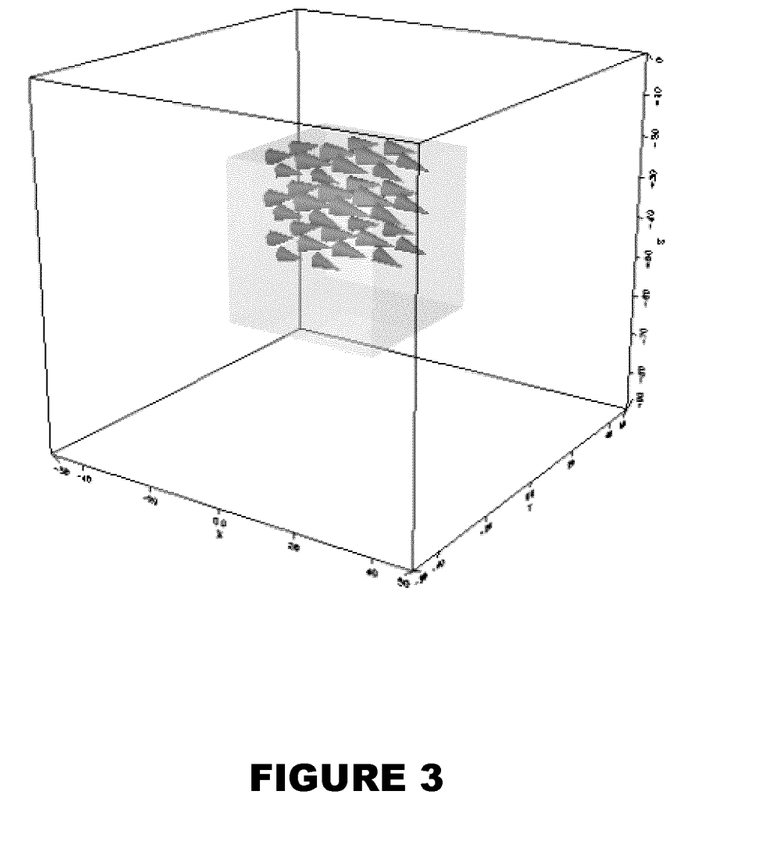
FIG. 3 shows the magnetic vector inversion recovered model as derived according to the methods of the invention.

Inverting the TMI data in FIG. 2 yields the model shown in FIG. 3 which should be compared to the true model shown in FIG. 1. There is some variability in the magnetization direction but the predominant direction is clearly EW, in agreement with the true model.

Vector magnetization models in 3D are difficult to interpret directly in all the but the simplest cases. In real-world exploration we need some simpler derived scalars which highlight the important information in the vector model. As shown above, the most robust and meaningful scalar is the amplitude of the vector magnetization and this should be the primary quantity used in interpretation. However, since the magnetization vector direction is the earth field direction for induced sources, it is tempting to attempt to use the directional information recovered in MVI (magnetic vector inversion) to generate scalars related to the earth field direction.

Figure 4A:
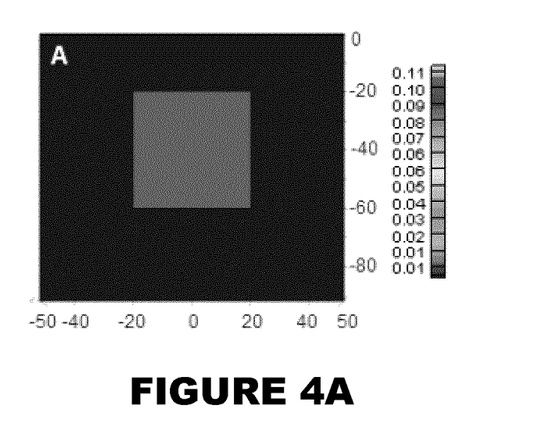
FIG. 4A shows a cross-section though the true model of FIG. 1
Figure 4B:
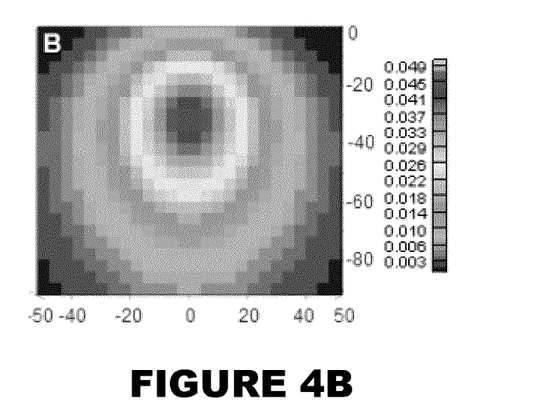
FIG. 4B shows the recovered amplitude of the magnetization vector from FIG. 4A.
Figure 4C:
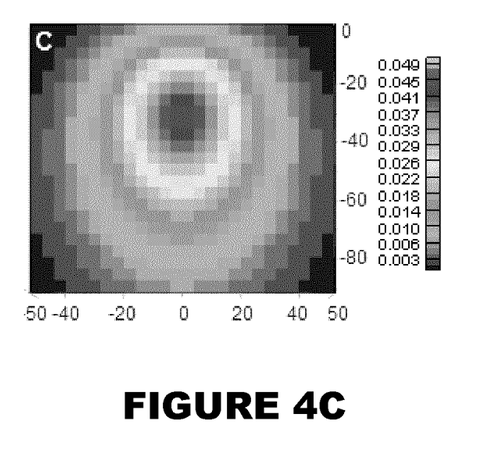
FIG. 4C shows the amplitude of the perpendicular-to-earth-field components of the magnetization of the model of FIG. 4A.
Figure 4D:
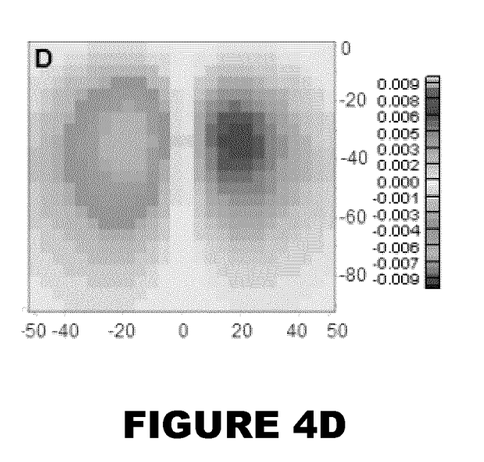
FIG. 4D shows the projection of the magnetization on to the earth field direction of the model of FIG. 4A.

There are many possibilities but we have found that three useful derived scalars for exploration are: the amplitude of the magnetization, the earth field projection of the magnetization, and the amplitude of the perpendicular-to-earth-field components of the magnetization. In exploration problems, the amplitude is robust by being independent on of any assumptions regarding the earth field, while the amplitude perpendicular is an approximate indicator of non-induced magnetization. To support our findings, these three derived scalars are shown in FIG. 4b, c, d for an EW slice through the model volume bisecting the target in the true model.

In exploration situations it is convenient to present MVI output normalized by the amplitude of the earth's magnetic intensity in the area of interest, that is, our results are displayed as where is the amplitude of the earth's magnetic intensity in the area of interest. Of course, under these circumstance, in an area of purely induced magnetization, the numerical values returned by MVI inversion will be directly comparable to those of scalar susceptibility inversion, in our case in SI.

Figure 5A:
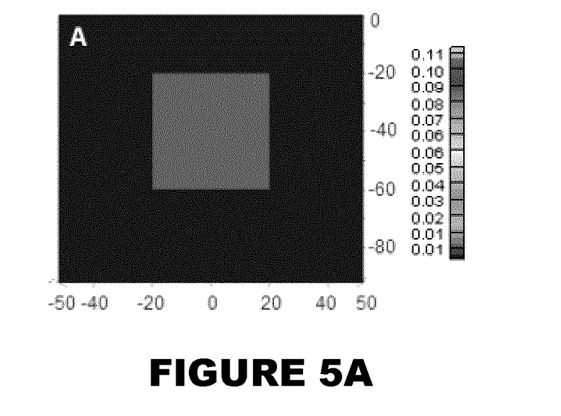
FIG. 5A shows a cross section through the true model of FIG. 1.
Figure 5B:
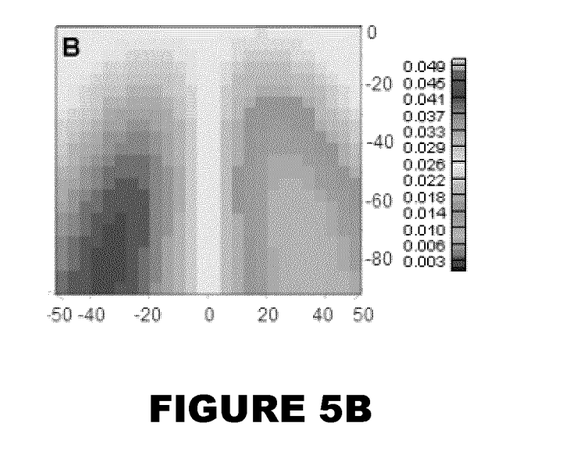
FIG. 5B shows the recovered scalar susceptibility of the model of FIG. 5A.

For completeness, and to show the contrast between MVI and conventional scalar inversion, FIG. 5b shows the equivalent section through a model produced by an inversion which assumes only induced magnetization. As should be expected, the recovered model using scalar inversion is a very poor representation of the true model, which in real-world exploration ultimately adds significant confusion to the interpretation process. This simple prism example demonstrates the power of magnetization vector inversion and its advantage over scalar susceptibility inversion in cases where the magnetization vector direction deviates from the earth field direction.

EXAMPLE II

The preceding pedagogical study of MVI on simulated data over a prism provides a solid basis for the much more important application of MVI to field data. As mentioned in the Introduction, it is hard to appreciate fully the impact on magnetic data interpretation by including non-induced magnetic sources. However, to motivate our assertion, we present typical results taken from TMI data collected over the Osborne deposit.

Figure 6:
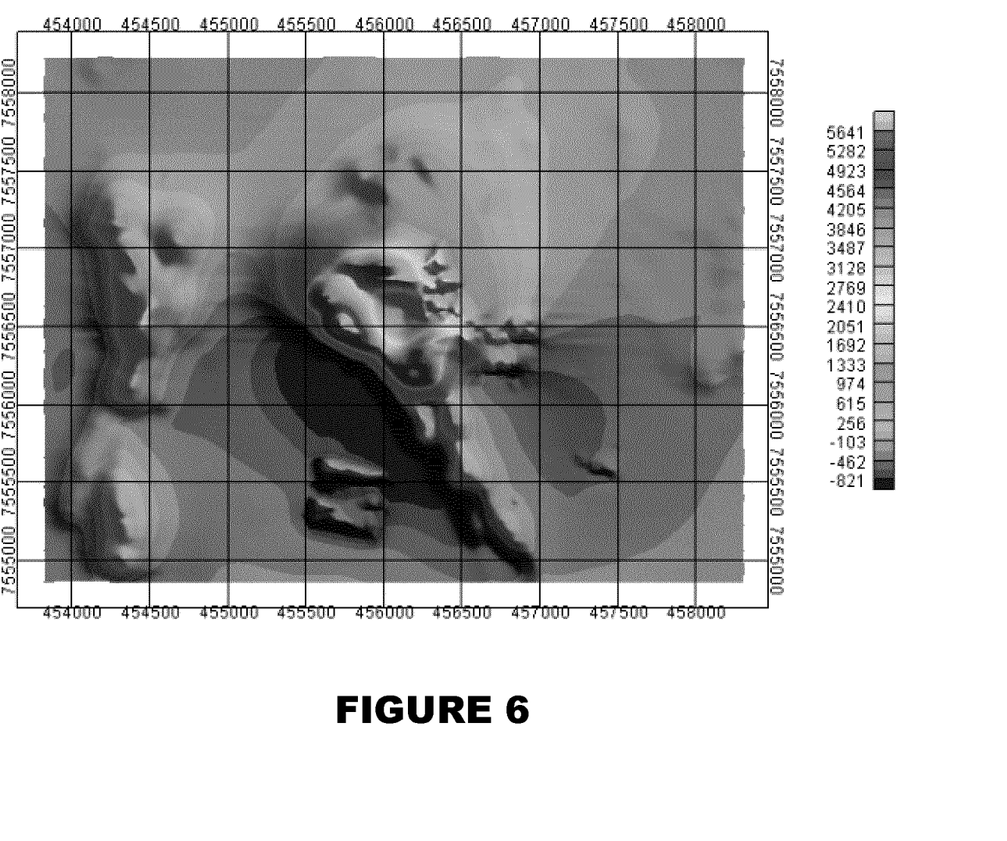
FIG. 6 shows the observed total magnetic intensity data acquired over a known property.

The history of the Osborne mine is well described elsewhere, see for example, Rutherford et al. 2005. Briefly, significant Cu—Au mineralization beneath 30-50 m of deeply weathered cover was confirmed in 1989. Intense drilling between 1990 and 1993 defined a total measured and indicated resource of 11.2 Mt at 3.51% Cu and 1.49 g/t Au. Exploration since 1995 has delineated high-grade primary mineralization dipping steeply East to some 1100 m vertical depth. As of 2001, total mined, un-mined and indicated resources are reported to be about 36 Mt and 1.1% Cu and 1 g/t Au. Current exploration is focused on mapping the high-grade mineralization to greater depths and mapping similar structures in the surrounding area. The geophysics includes TMI data over the property, which is shown in FIG. 6. The TMI data were acquired in 1997 flown at 40 m clearance on 40 m line spacing.

Figure 7:
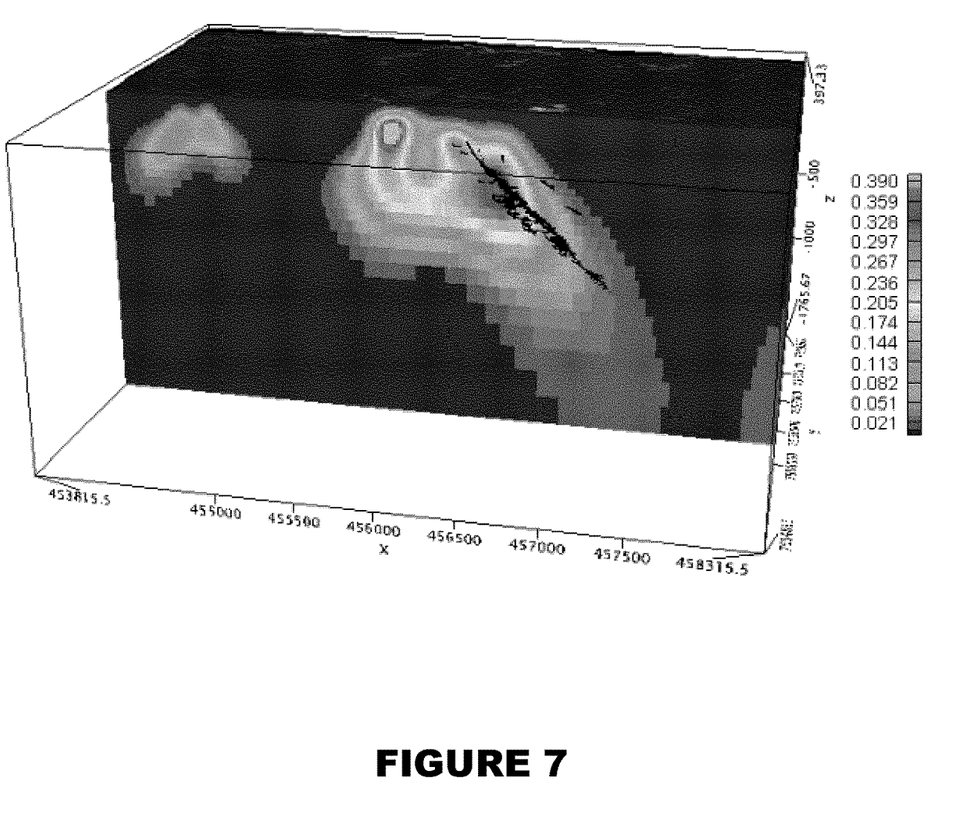
FIG. 7 shows an East-West section through the recovered model of FIG. 6 using the method according to the invention.
Figure 8:
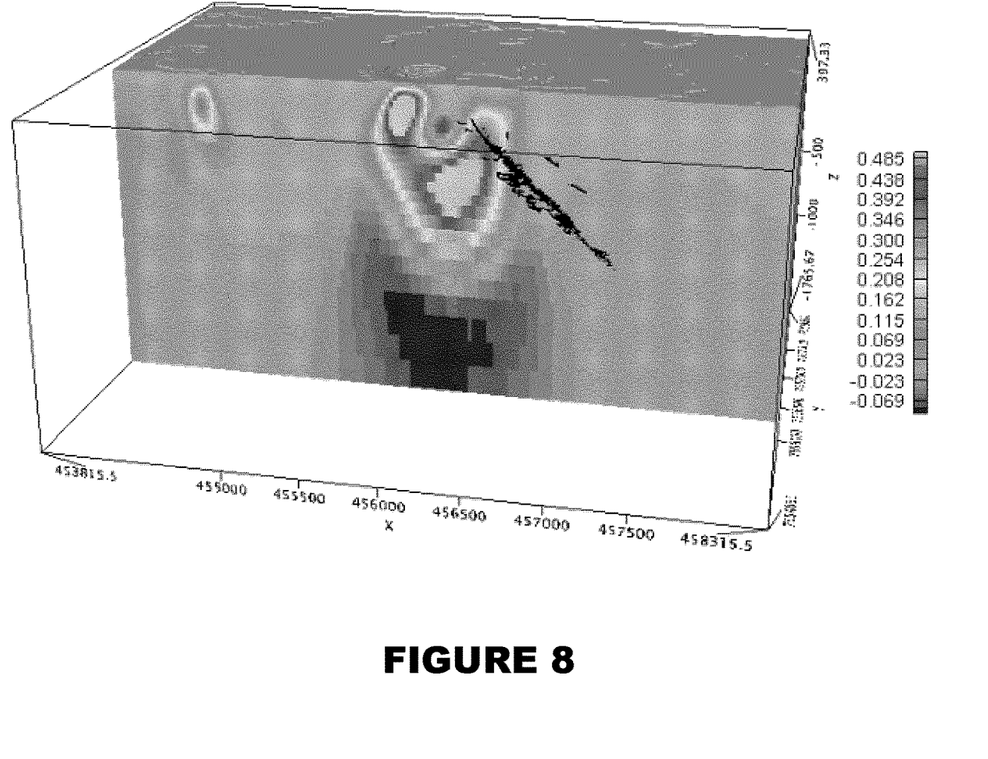
FIG. 8 shows an East-West section through the recovered model of FIG. 6 using prior art methods.
Figure 9:
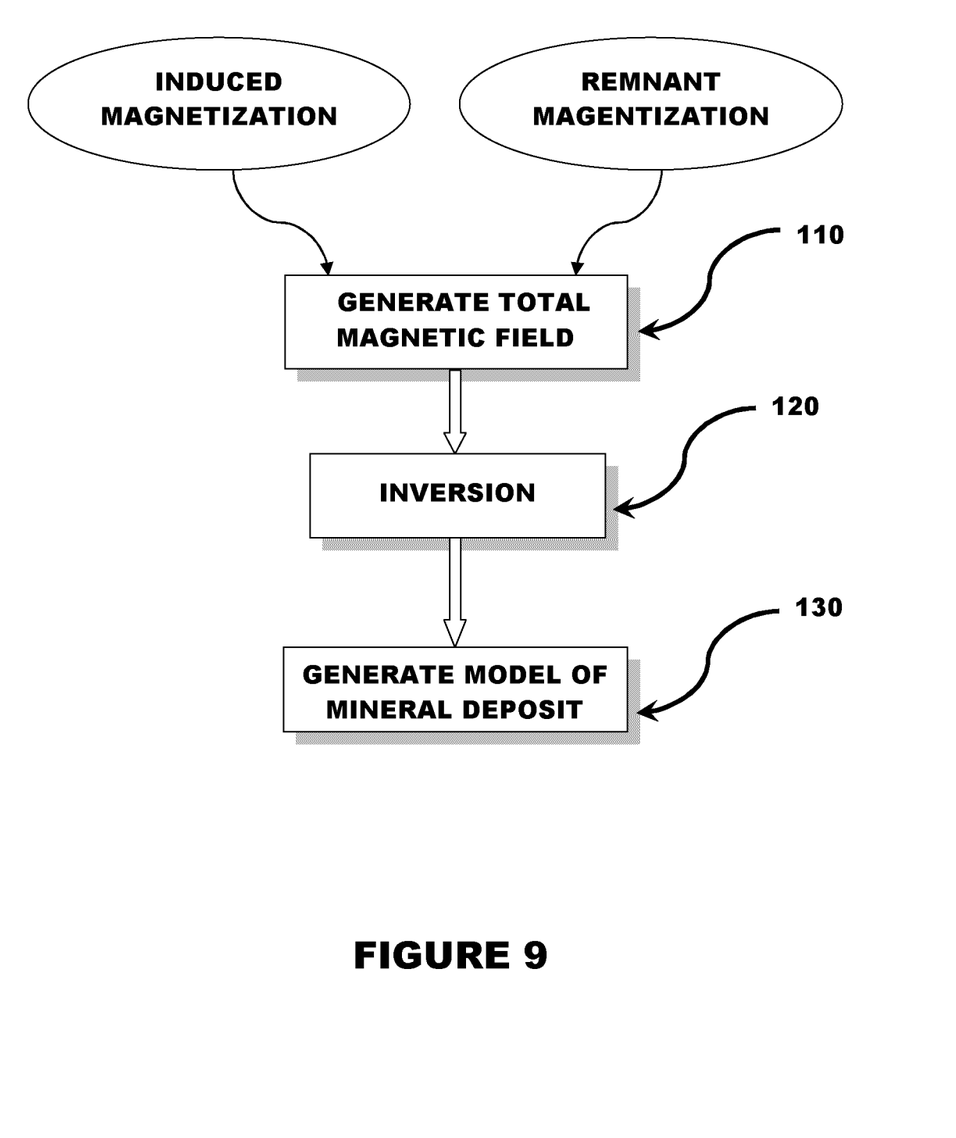
FIG. 9 is a flowchart showing one embodiment of the present invention.
Figure 10:
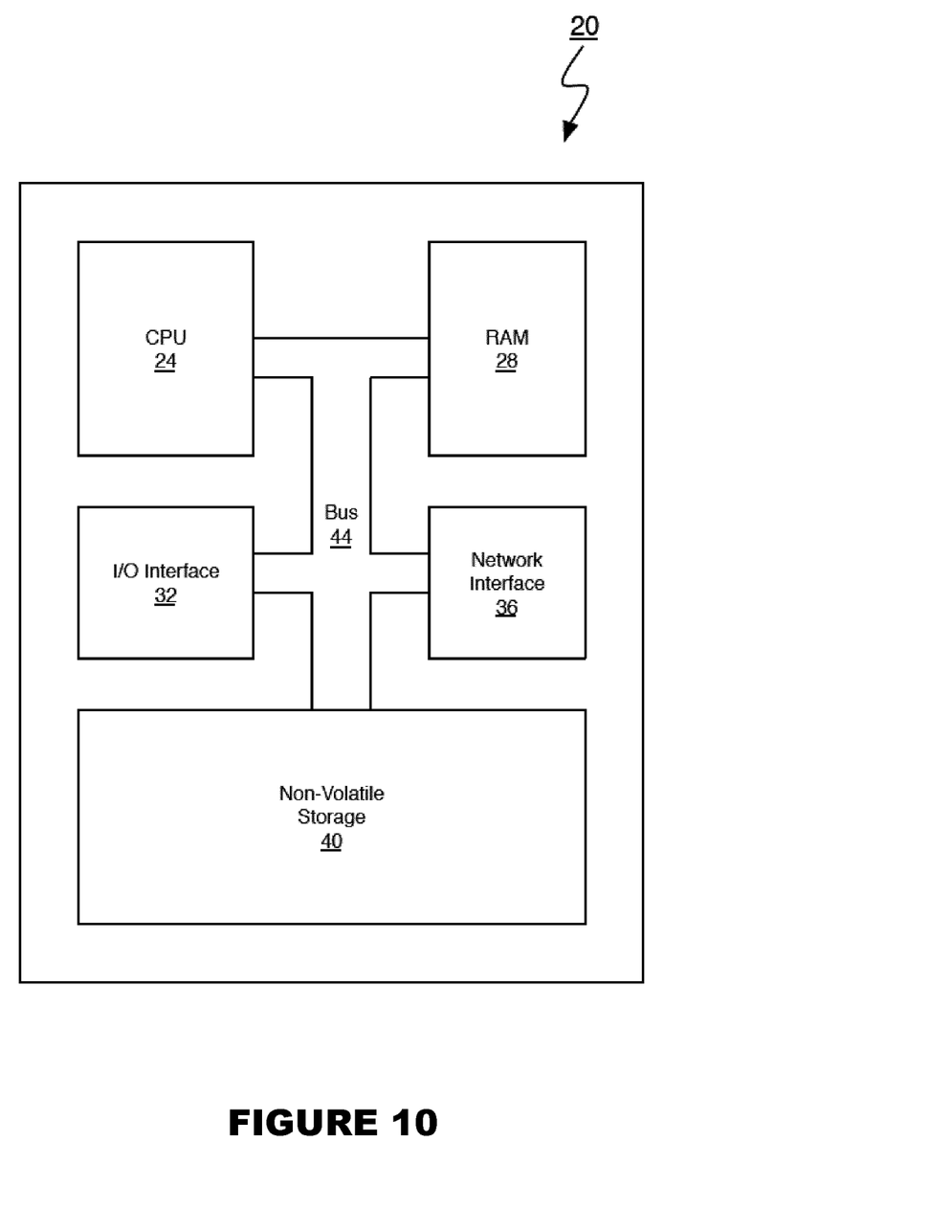
FIG. 10 is a representative image of a general computer system on which the invention may be implemented.

Magnetization Vector Inversion of the Osborne TMI data yields the magnetization vector amplitude earth model shown in FIG. 7. Superimposed (in black) is the subsequently discovered mineralization from extensive drilling and underground mining. For comparison, FIG. 8 shows the corresponding scalar susceptibility inversion. Comparison between FIG. 7 and FIG. 8 clearly shows that inverting for the magnetization vector provides a much better model for interpretation and follow up. The scalar inversion fails to represent reality in this case suggesting, most likely, that the scalar assumption is violated: a common occurrence in mineral exploration in our experience. In contrast the MVI model is consistent with the drilling results, and furthermore, indicates a steeply dipping volume on the Eastern flank.

CONCLUSION

As has been demonstrated above, modifying the prior art process of generating a model of a subsurface zone based on the induced magnetization response by including the effects of remnant magnetization. Applicant has shown an exemplary method for including the effects of remnant magnetization, and provided a pair of examples to aid in understanding the invention and its advantages over the prior art.

Variations and adaptations to the methods herein described are contemplated by the invention and accordingly, the above-described embodiments are intended to be examples of the present invention and alterations and modifications may be effected thereto, by those of skill in the art, without departing from the scope of the invention that is defined solely by the claims appended hereto.

REFERENCES

The following list of references are provided to aid in the theoretical understanding of the invention, and to provide a basis from which a person skilled in the art will appreciate the inventive step applicant has provided over the prior art.

Butler, R. F., 1992, Paleomagnetism: magnetic domains to geologic terranes, Blackwell Scientific Publications.

Kubota, R., and Uchiyama A., Three-dimensional magnetization vector inversion of a seamount, Earth Planets Space, 2005, 57, 691-699

Li, Y., and D. W. Oldenburg, 3-D inversion of magnetic data, Geophysics, 61, 1996, 394-408.

Lelièvre, P. G., and Oldenburg, D. W., 2009, A 3D total magnetization inversion applicable when significant, complicated remanence is present, Geophysics, 74, L21-L30

McEnroe, S. A., Fabian, K., Robinson, P., Gaina, C., Brown, L., 2009, Crustal Magnetism, Lamellar Magnetism and Rocks that Remember, Elements, 5, 241-246.

Pilkington, M., 1997, 3-D magnetic imaging using conjugate gradients, Geophysics, 62, 1132-1142.

Rutherford, N. F., Lawrance, L. M., and Sparks, G., 2005, Osborne Cu—Au Deposit, Cloncurry, North West Queensland, CRC LEME Report.

Shearer, S., and Y. Li, 2004, 3D Inversion of magnetic total gradient data in the presence of remanent magnetization: 74th Annual Meeting, SEG, Technical Program, Expanded Abstracts, 23, 774-777.

Silva, J. B. C., Medeiros, W. E., and Barbosa, V. C. F., 2001, Potential-field inversion: Choosing the appropriate technique to solve a geologic problem, Geophysics, 66, 511-520.

Telford, W. M., Geldart, L. P., Sherriff, R. E., and Keys, D. A., 1990, Applied Geophysics, Cambridge University Press.

Tullemans, F. J., Agnew P., and Voulgaris, P., 2001, The Role of Geology and Exploration Within the Mining Cycle at the Osborne Mine, NW Queensland, in Monograph 23—Mineral Resource and Ore Reserve Estimation—The AusIMM Guide to Good Practice, Australian Institute of Mining and Metallurgy, Melbourne, 157-168.

Zdhanov, M. S., Geophysical Inverse Theory and Regularization Problems, Method in Geochemistry and Geophysics 36, 2002, Elsevier Science B.V., Amsterdam, The Netherlands.

Zhdanov, M. S., and Portniaguine, O., 2002, 3-D magnetic inversion with data compression and image focusing, Geophysics, 67, 1532-1541

The invention claimed is:

1. A method of mapping a subsurface anomalous region of the earth and subsequent follow-up by real-world exploration of mineral deposits in the region, the method comprising:
    obtaining an airborne geophysical survey of the region;
    obtaining a total-magnetic-intensity (TMI) model of the subsurface region from the survey, said obtaining said TMI model comprising:
        i. acquiring a first model of an induced magnetic field from induced sources in said subsurface;
        ii. acquiring a second model of a remanent magnetic field from remanent sources in said subsurface;
        iii. generating the TMI model from the first model of said induced magnetic field and the second model of said remanent magnetic field;
    inverting via Magnetization Vector Inversion of said TMI model;
    generating a mineral deposit model of said subsurface anomalous magnetization zone based on said inverting; and
    undertaking real-world exploration for said mineral deposits consistent with the mineral deposit model
    wherein said inverting is carried out by solving for m in:

$$\text{Min}\phi(m) = \phi_D(m) + \lambda\phi_M(m)$$

$$\phi_D(m) = \sum_j^M \left|\frac{G_j m - B_j}{e_j}\right|^2$$

$$\phi_M(m) = \sum_\gamma^3 |w_\gamma \partial_\gamma m|^2 + |w_0 m|^2$$

$$\lambda: \phi_D(m) = \chi_T^2$$

where $\phi$ is the total objective function, $\phi_D$ is a data term, $\phi_M$ is a model term, $\lambda$ is a Tikohonov regularization parameter, $B_j$ is the predicted magnetic field anomaly at point j, $e_j$ is the error associated with point j, $\delta_\gamma$ is the gradient of the model, m is the amplitude of the model, and $w_\gamma$ and $w_0$ are weighting terms.

2. A method according to claim 1, wherein said inverting includes an inversion wherein induced magnetization portions of said TMI model are modified by remanent magnetization portions of said TMI model.

3. A method according to claim 1, wherein said TMI model comprises a total magnetic intensity model.

4. A method according to claim 1, wherein said inverting includes applying a vector conversion to induced magnetization portions of said TMI model.

5. A method of subsurface mapping a subsurface anomalous magnetization zone of the earth and subsequent follow-up by real-world exploration of mineral deposits in the region, the method comprising:
    i. measuring an induced magnetic field from induced sources in said subsurface anomalous magnetization zone using an airborne method;
    ii. measuring a remanent magnetic field from remanent sources in said subsurface anomalous magnetization zone using an airborne method;
    iii. generating an induced magnetic field model of said subsurface anomalous magnetization zone from said measuring of said induced magnetic field;
    iv. generating a remanent magnetic field model of said subsurface anomalous magnetization zone from said measuring of said remanent magnetic field;
    v. combining said remanent and induced magnetic field models to form a total magnetic field model;
    vi. inverting said total magnetic field model; and
    vii. generating a mineral deposit model of said subsurface anomalous magnetization zone based on said inverting; and
    vii. undertaking real-world exploration for said mineral deposits consistent with the mineral deposit model;
wherein said inverting is carried out by solving for m in:

$$\text{Min}\phi(m) = \phi_D(m) + \lambda\phi_M(m)$$

$$\phi_D(m) = \sum_j^M \left|\frac{G_j m - B_j}{e_j}\right|^2$$

$$\phi_M(m) = \sum_\gamma^3 |w_\gamma \partial_\gamma m|^2 + |w_0 m|^2$$

$$\lambda: \phi_D(m) = \chi_T^2$$

where $\phi$ is the total objective function, $\phi_D$ is a data term, $\phi_M$ is a model term, $\lambda$ is a Tikohonov regularization parameter, $B_j$ is the predicted magnetic field anomaly at point j, $e_j$ is the error associated with point j, $\delta_\gamma$ is the gradient of the model, m is the amplitude of the model, and $w_\gamma$ and $w_0$ are weighting terms.

6. A method according to claim 5, wherein said inverting includes applying a vector conversion to the induced magnetic field model portion of said total magnetic field model.

7. A non-transitory computer readable medium for use in the method of claim 1 the medium having instructions thereon for executing a computer program that when executed on a computer carries out a method for modeling a subsurface zone of anomalous magnetization comprising the steps of:
    i. generating a magnetic field model of said subsurface anomalous magnetization zone by:
        a) acquiring a first model of an induced magnetic field from induced sources in said sub surface;
        b) acquiring a second model of a remanent magnetic field from remanent sources in said subsurface; and
        c) generating the magnetic field model from first model of said induced magnetic field and second model of said remanent magnetic field;
    ii. inverting said magnetic field model; and iii. generating a mineral deposit model of said subsurface anomalous magnetization zone based on said inverting; wherein said first generating step includes generating said magnetic field model from induced magnetization sources and remanent magnetization sources using airborne acquisition methods from said subsurface anomalous magnetization zone;

wherein said inverting is carried out by solving for m in:

$$\text{Min}\phi(m) = \phi_D(m) + \lambda\phi_M(m)$$

$$\phi_D(m) = \sum_j^M \left|\frac{G_j m - B_j}{e_j}\right|^2$$

$$\phi_M(m) = \sum_\gamma^3 |w_\gamma \partial_\gamma m|^2 + |w_0 m|^2$$

$$\lambda: \phi_D(m) = \chi_T^2$$

where $\phi$ is the total objective function, $\phi_D$ is a data term, $\phi_M$ is a model term, $\lambda$ is a Tikohonov regularization parameter, $B_j$ is the predicted magnetic field anomaly at point j, $e_j$ is the error associated with point j, $\delta_\gamma$ is the gradient of the model, m is the amplitude of the model, and $w_\gamma$ and $w_0$ are weighting terms.

8. A non-transitory computer readable medium according to claim 7, wherein said inverting includes an inversion wherein induced magnetization portions of said magnetic field model are modified by remanent magnetization portions of said magnetic field model.

9. A non-transitory computer readable medium according to claim 7, wherein said magnetic field model comprises a total magnetic intensity model.

10. A non-transitory computer readable medium according to claim 7, wherein said inverting step includes applying a vector conversion to induced magnetization portions of said magnetic field model.

11. A non-transitory computer readable medium for use in the method of claim 5 the medium having instructions thereon for executing a computer program that when executed on a computer carries out a method for modeling a subsurface zone of anomalous magnetization comprising the steps of:

acquiring an induced magnetic field from induced sources in said subsurface anomalous magnetization zone using an airborne method;

acquiring a remanent magnetic field from remanent sources in said subsurface anomalous magnetization zone using an airborne method;

generating an induced magnetic field model of said subsurface anomalous magnetization zone from an induced magnetic field produced by induced magnetization sources and acquired by an airborne acquisition method from said subsurface anomalous magnetization zone;

generating a remanent magnetic field model of said subsurface anomalous magnetization zone from a remanent magnetic field produced by remanent magnetization sources and acquired by an airborne acquisition method from said subsurface anomalous magnetization zone;

combining said remanent and induced magnetic field models to form a total magnetic field model;

inverting said total magnetic field model; and generating a model of said subsurface anomalous magnetization zone based on said inverting;

wherein said inverting is carried out by solving for m in:

$$\text{Min}\phi(m) = \phi_D(m) + \lambda\phi_M(m)$$

$$\phi_D(m) = \sum_j^M \left|\frac{G_j m - B_j}{e_j}\right|^2$$

$$\phi_M(m) = \sum_\gamma^3 |w_\gamma \partial_\gamma m|^2 + |w_0 m|^2$$

$$\lambda: \phi_D(m) = \chi_T^2$$

where $\phi$ is the total objective function, $\phi_D$ is a data term, $\phi_M$ is a model term, $\lambda$ is a Tikohonov regularization parameter, $B_j$ is the predicted magnetic field anomaly at point j, $e_j$ is the error associated with point j, $\delta_\gamma$ is the gradient of the model, m is the amplitude of the model, and $w_\gamma$ and $w_0$ are weighting terms.

12. A non-transitory computer readable medium according to claim 11, wherein said inverting step includes applying a vector conversion to induced magnetization portions of said magnetic field model.

* * * * *